United States Patent [19]

Dofredo

[11] Patent Number: 5,671,537
[45] Date of Patent: Sep. 30, 1997

[54] CHAIN SAW ATTACHMENT FOR USE IN TRIMMING SHRUBBERY

[76] Inventor: Nestor V. Dofredo, 1531 15th Ave. S., Seattle, Wash. 98144

[21] Appl. No.: 723,591

[22] Filed: Oct. 1, 1996

Related U.S. Application Data

[63] Continuation-in-part of Ser. No. 538,499, Sep. 29, 1995, Pat. No. 5,560,111.

[51] Int. Cl.⁶ ............................................ B27B 17/02
[52] U.S. Cl. .................................... 30/371; 30/382
[58] Field of Search .......................... 30/122, 371, 124, 30/382, 383; 56/290, 291; 144/48.5, 48.6, 35.1

[56] References Cited

U.S. PATENT DOCUMENTS

| | | | |
|---|---|---|---|
| 2,034,058 | 3/1936 | Sacrey | 56/291 |
| 2,642,901 | 6/1953 | Hayden | 30/371 |
| 2,698,034 | 12/1954 | Jakku | 30/371 |
| 2,797,717 | 7/1957 | Budd | 30/371 |
| 2,925,105 | 2/1960 | Hayden | 30/383 |
| 3,808,684 | 5/1974 | Ludwig | 30/382 |
| 3,815,229 | 6/1974 | Granberg | 30/388 |
| 4,142,292 | 3/1979 | Ulrich | 30/371 |
| 5,123,168 | 6/1992 | Lyons | 30/382 |
| 5,511,315 | 4/1996 | Raya | 30/371 |
| 5,560,111 | 10/1996 | Dofredo | 30/371 |

FOREIGN PATENT DOCUMENTS

| | | | |
|---|---|---|---|
| 1574058 | 7/1969 | France | 30/382 |
| 1042282 | 9/1966 | United Kingdom | 30/383 |

*Primary Examiner*—Hwei-Siu Payer
*Attorney, Agent, or Firm*—Joan H. Pauly

[57] ABSTRACT

An attachment for a chain saw (100) includes two elongated members (4D) mountable on the opposite faces of the chain guide (102). Each member (4D) has an elongated center portion (6D) configured to be secured to the chain guide (102) in a position closely adjacent to the corresponding face thereof. An angled portion (30) extends laterally outwardly from the outer edge of the center portion (6D). A plurality of spaced apart teeth (12D) project from the angled portion (30) substantially parallel to the chain guide (102) over and beyond the chain (104). Each tooth (12D) has, on an upstream edge thereof, a surface (18D) angled laterally outwardly in an upstream direction to help retain the chain on a path around the periphery of the chain guide (102). The angled surface (18D) is preferably formed by bending the edge of a substantially flat tooth. The surface (18D) preferably extends along the tooth (12D) from its pointed tip portion (36) to and along a radiused junction (34) with the angled portion (30) of the elongated member (4D).

13 Claims, 4 Drawing Sheets

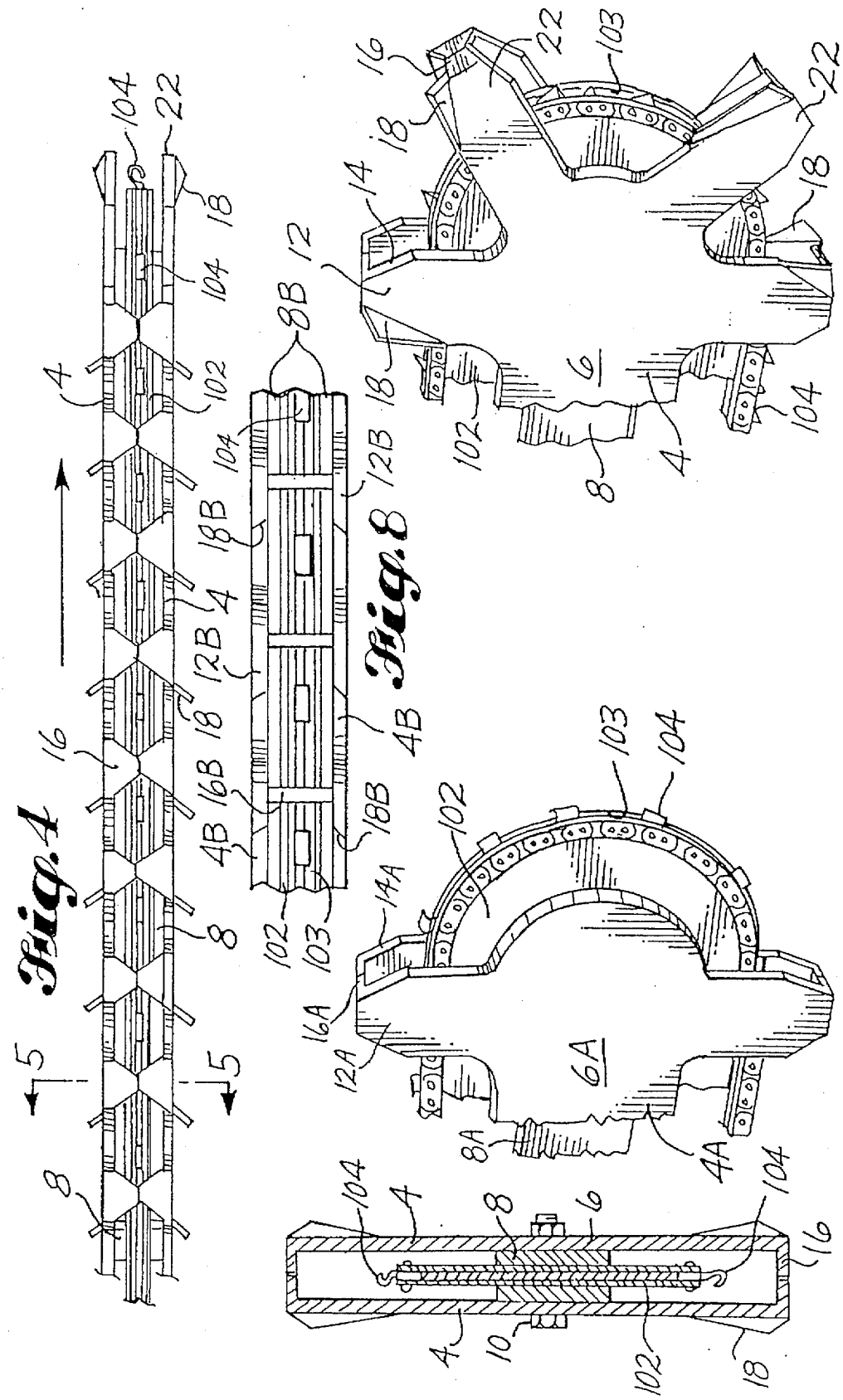

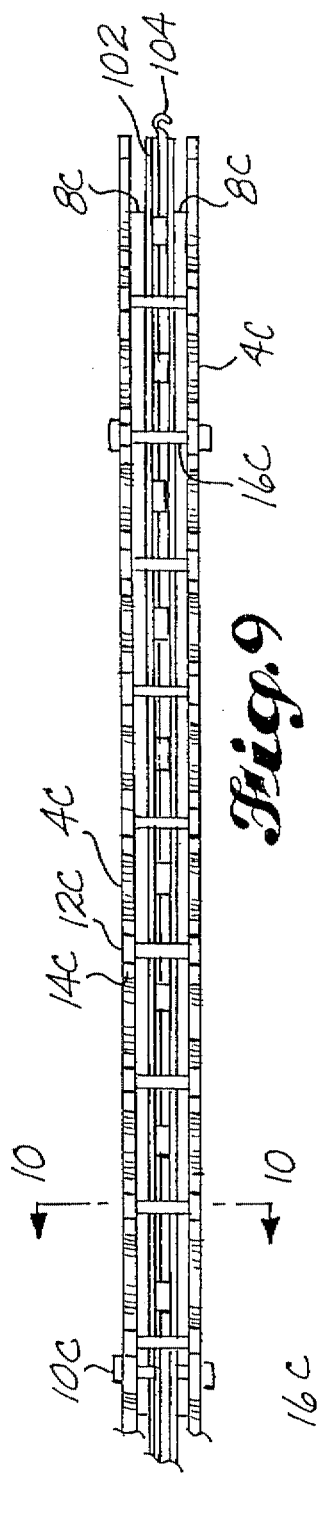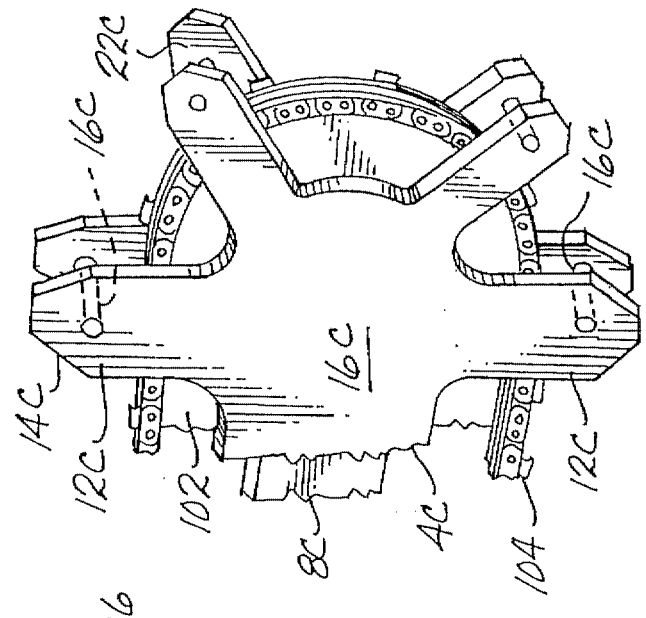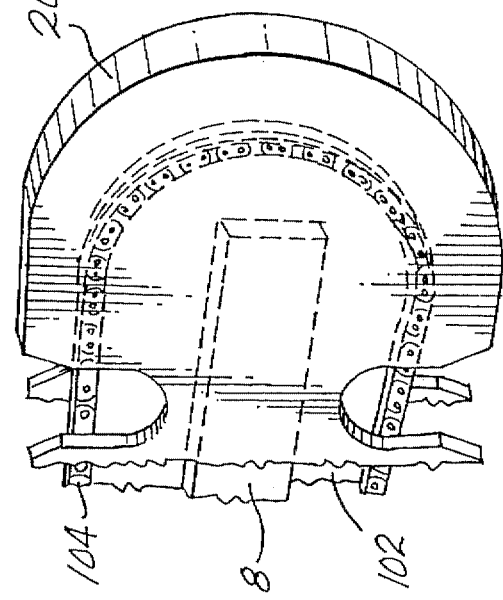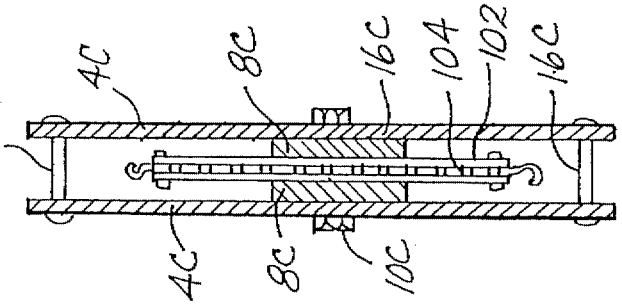

CHAIN SAW ATTACHMENT FOR USE IN TRIMMING SHRUBBERY

RELATED APPLICATION

This application is a continuation-in-part of U.S. patent application Ser. No. 08/538,499, filed Sep. 29, 1995 and soon to be issued as U.S. Pat. No. 5,560,111.

TECHNICAL FIELD

This invention relates to chain saw attachments and, more particularly, to an attachment having first and second elongated members mountable on opposite faces of the chain saw chain guide, each such member having an elongated center portion, an angled portion extending laterally outwardly from the center portion, and a plurality of teeth projecting from the angled portion parallel to the chain guide past the chain, and said teeth having angled surfaces angled laterally outwardly in an upstream direction to help retain the chain on a path around the chain guide.

BACKGROUND INFORMATION

Professional and amateur landscaping and gardening frequently requires trimming hedges, shrubs, and small trees. This task is commonly carried out using manual clippers and/or powered hedge trimmers. The use of manual clippers is tiring and very time consuming. A typical hedge trimmer helps to speed the trimming process but is capable of cutting only small twigs and foliage. Even small branches generally require an additional tool. A chain saw is powerful enough to cut branches of all sizes but is not often used in its basic form for trimming operations because of safety considerations and difficulty in engaging flexible shoots and small twigs to be cut by the chain. Attachments for chain saws designed for use in trimming operations are disclosed in U.S. Pat. Nos. 2,642,901, granted Jun. 23, 1953, to E. A. Hayden; No. 2,698,034, granted Dec. 28, 1954, to E. A. Jakku; No. 2,797,717, granted Jul. 2, 1957, to J. H. Budd; No. 3,808,684, granted May 7, 1974, to Robert L. Ludwig; U.S. 4,142,292, granted Mar. 6, 1979, to Ray R. Ulrich; and U.S. 5,123,168, granted Jun. 23, 1992, to William E. Lyons.

SUMMARY OF THE INVENTION

The present invention is directed toward an attachment for a chain saw of a type having an elongated chain guide with opposite faces bounded by a periphery, and an endless chain powered by a motor to move around said periphery. According to an aspect of the invention, the attachment comprises first and second elongated members mountable on the opposite faces. Each elongated member includes an elongated center portion, an elongated angled portion, and a plurality of spaced apart teeth. The center portion is configured to be secured to the chain guide in a position closely adjacent to the corresponding face thereof. The angled portion extends laterally outwardly from an edge of the center portion and forms an acute angle with the chain guide. The teeth are positioned to project from the angled portion substantially parallel to the chain guide over and beyond the chain. Each tooth includes, on an upstream edge of the tooth, relative to the motion of the chain about the chain guide, an angled surface angled laterally outwardly in an upstream direction to help retain the chain on a path around the periphery.

In the currently preferred form, each tooth has a main portion that has substantially parallel opposite edges. The main portion extends from a radiused junction with the angled portion to a pointed outer tip portion. The angled surface extends along an upstream one of the opposite edges and an upstream portion of the radiused junction.

The angled surface of the tooth may be formed in various ways. Preferably, each tooth is substantially flat, and the upstream edge is bent laterally outwardly to provide the angled surface. An alternative to this preferred configuration is an upstream edge that is beveled to provide the angled surface.

An optional feature is the provision of spacers between the teeth. When the elongated members are mounted on the opposite faces of the chain guide, the teeth are arranged in opposite confronting pairs. The teeth in each pair are substantially parallel to each other. A spacer extends perpendicularly between the teeth in each pair to inhibit bending of the teeth toward the chain. The spacers may be formed in various ways. For example, each spacer may comprise a pin extending between and attached to the teeth in the corresponding pair.

The number of teeth may be varied. The teeth may be positioned all the way around the working portion of the chain or only around a portion thereof. For example, the teeth could be omitted from one of the longitudinal edges of the chain guide and/or the rounded tip of the chain guide. Preferably, the teeth are arranged in two rows extending in opposite directions from the angled portion so that there is a row of pairs of teeth along each of the longitudinal edges of the chain guide. Additional teeth may be provided on the rounded end of the chain guide, preferably with sufficient space therebetween to permit cutting of larger branches.

The attachment of the invention provides a convenient and cost effective means for converting a standard chain saw into a trimming tool capable of carrying out a variety of trimming operations. Such operations include cutting various types of vegetation from pliant shoots to small branches. The teeth in the attachment help to protect the user from contact with the cutting chain. They also serve to capture pliant vegetation to position it for cutting and to control the direction in which cut vegetation moves. The combination of the center portion closely adjacent to the chain guide and the angled portion provides a stable interface between the attachment and the chain guide and helps ensure that each tooth along the length of the attachment is maintained in its proper spaced relationship relative to the chain.

The angled surface on the upstream edge of each tooth helps to retain the chain on its proper path around the periphery of the chain guard. With use, the endless chains of chain saws have a tendency to loosen, which can lead to their disengagement from the track around the periphery of the chain guide. The angled surface on the attachment teeth provides a guide for the chain when it deviates from its path and tends to guide the chain back into its proper path. It also helps alert the user to the need for tightening the chain when nicks and scratches begin to appear on the angled surface.

In the preferred embodiment, the elongated member, including its angled portion and the angled surfaces of the teeth, can be die cut from a piece of sheet metal. This allows quick and low cost manufacture of the attachment.

The optional feature of a spacer between the tip portions of the teeth increases the stability of the attachment structure and enhances the action of the elongated ribs in maintaining the teeth properly spaced away from the chain. It also helps to prevent bending of the teeth and consequent damage to the attachment.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 4 is a view of the chain guide and attachment shown in FIGS. 1–3, looking toward a longitudinal edge of the chain guide.

FIG. 5 is a sectional view taken along the line 5—5 in FIG. 4.

FIG. 6 is an enlarged pictorial view of the front rounded end of the chain guide and attachment shown in FIGS. 1–5.

FIG. 7 is like FIG. 6 except that it shows a modified form of the attachment shown in FIGS. 1–6.

FIG. 8 is a fragmentary view like a portion of FIG. 4 except that it shows another embodiment of the angled surface feature of the attachment.

FIG. 9 is like FIG. 4 except that it shows another modified form of the attachment.

FIG. 10 is a sectional view taken along the line 10—10 in FIG. 9.

FIG. 11 is like FIGS. 6 and 7, but shows the attachment shown in FIGS. 9 and 10.

FIG. 12 is a view like FIGS. 6, 7, and 11, showing still another modification of the front tip portion of the attachment.

BEST MODE FOR CARRYING OUT THE INVENTION

Figure 1:
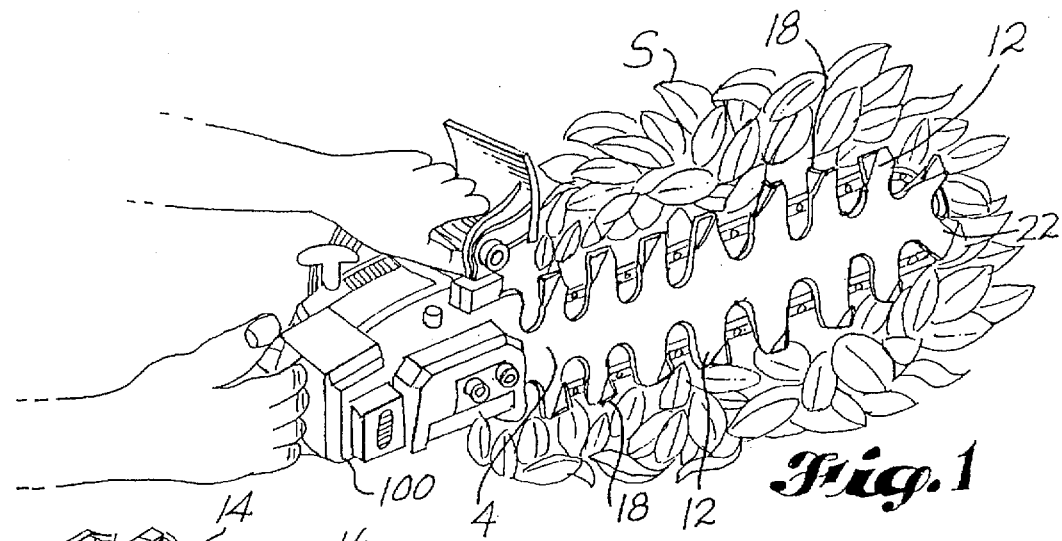
FIG. 1 is a pictorial view of an attachment mounted on a chain saw and being used to trim a shrub.
Figure 2:
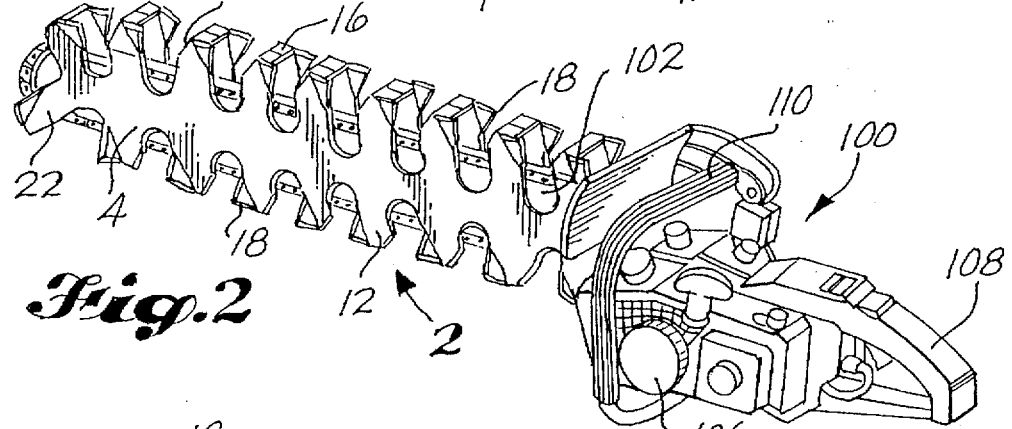
FIG. 2 is a pictorial view of the chain saw and attachment shown in FIG. 1.
Figure 13:
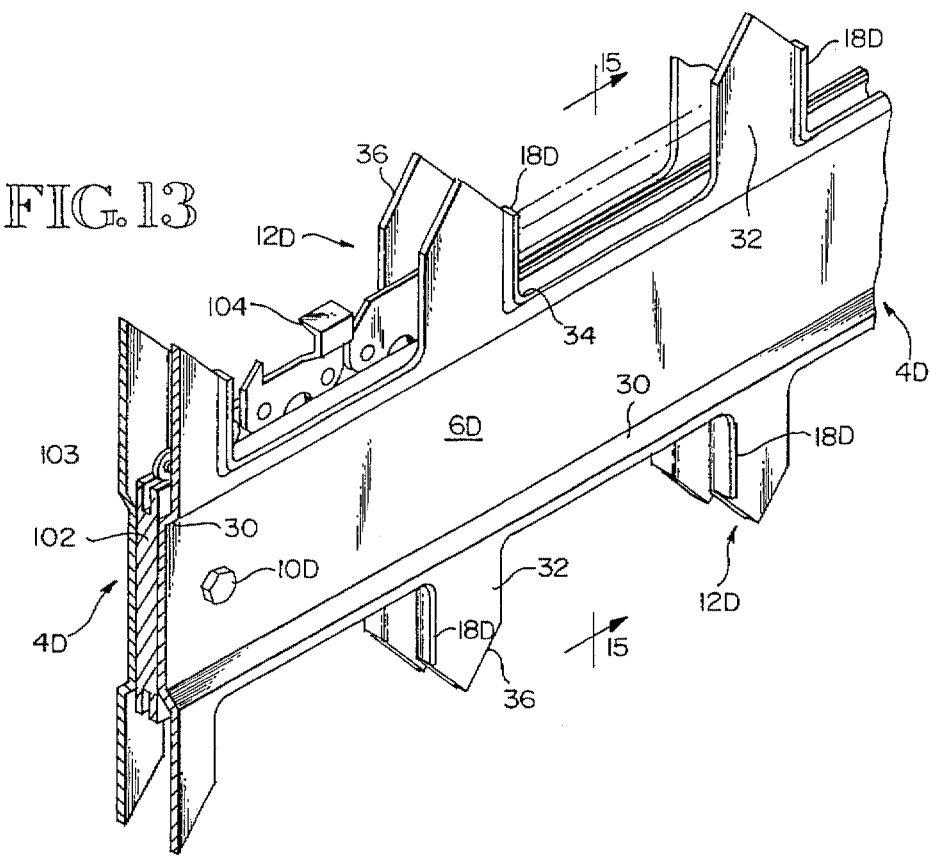
FIG. 13 is a fragmentary pictorial view of the currently preferred embodiment of the invention installed on a chain guide.
Figure 14:
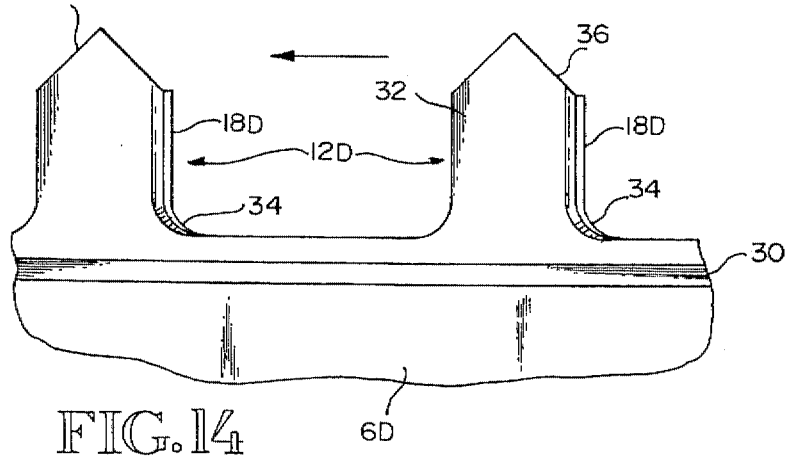
FIG. 14 is a fragmentary elevational view of one of the elongated members shown in FIG. 13.
Figure 15:
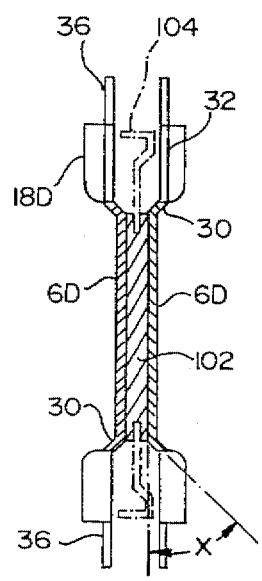
FIG. 15 is a sectional view taken along the line 15—15 in FIG. 13.

The drawings show attachments that embody various aspects and features of the invention. FIGS. 13–15 show an embodiment that is constructed according to the invention and that constitutes the best mode for carrying out the invention currently known to the applicant. The attachment is designed for use with a standard chain saw, such as the chain saw 100 shown in the drawings and particularly in FIGS. 1 and 2. The illustrated chain saw 100 is of a type having an elongated flat chain guide 102 with opposite faces bounded by a periphery. The periphery is conventionally provided with a channel 103 that receives an endless chain 104. A motor 106 powers the chain saw 100 to move the chain 104 around the periphery of the chain guide 102. The chain 104 moves along a path defined by the channel 103. The chain saw 100 is provided with two handles 108, 110 to be gripped by the user, as illustrated in FIG. 1. In FIG. 1, the chain saw 100 is shown in what is anticipated will be a typical use position for trimming a shrub S.

A first embodiment of the attachment 2 is shown in FIGS. 1–6. The attachment 2 comprises first and second elongated members 4, which are preferably mirror images of each other. Each member 4 has an elongated center portion 6 and a plurality of spaced apart teeth 12 projecting from the center portion 6. The two opposite members 4 are mountable on the opposite faces of the chain guide 102, as shown in FIGS. 1–6. Each member 4, including its teeth 12, has a flat plate-like configuration with an elongated rib 8 extending along the inner flat surface of the center portion 6 that is adjacent to the chain guide 102 when the attachment 2 is installed on the chain saw 100. The rib 8 has an elongated flat configuration to provide a firm abutting surface between the attachment member 4 and the chain guide 102 extending along at least most of the length of the chain guide 102. The rib 8 may be formed separately from the flat plate-like main portion of the member 4, or the entire member 4, including its center portion 6, rib 8, and teeth 12, may be integrally formed.

The two members 4 are attached to the chain guide 102 by means of fasteners, such as the bolts 10 shown in the drawings. In most cases, two bolts 10 are sufficient to secure the attachment 2 to the chain guide 102. Each bolt 10 extends through the center portion 6 of each member 4, including the rib 8 extending therealong. It also extends through an aligned hole in the chain guide 102. The hole in the chain guide 102 may be a preexisting hole or may be drilled by the person installing the attachment 2 on the chain saw 100.

The rib 8 has a flat rectangular outer surface positioned to abut the face of the chain guide 102 on which the member 4 is mounted. ideally, abutment would occur throughout the entire outer surface of the rib 8. However, minor irregularities in the face of the chain guide 102 and the outer surface of the rib 8 are, as a practical matter, unavoidable. Therefore, the abutment between the two surfaces is partial, with portions of the outer surface of the rib 8 being closely adjacent to, rather than in abutment with, the chain guide 102. Preferably, the bolts 10 are tightened to maximize the area of abutment between the chain guide 102 and the ribs 8.

The teeth 12 project outwardly from the center portion 6 of the member 4 substantially parallel to the chain guide 102 over and beyond the chain 104. The projecting of the teeth 12 beyond the chain 104 helps protect the user against contact with the chain 104 and also helps to hold foliage in position to be cut by the chain 104. Since the teeth 12 are formed as extensions of the flat plate-like portion of the member 4, the presence of the rib 8 serves to space the teeth 12 laterally away from the chain 104. This prevents the attachment 2 from interfering with the movement of the chain 104 about the chain guide 102. As shown in FIGS. 1–6, the arrangement of teeth 12 includes two rows of teeth 12 extending in opposite directions from the center portion 6 of each elongated member 4. It also includes two teeth 22 at the forward tip of the chain guide 102 arranged at an angle that provides greater spacing between the two forward teeth 22 than between the teeth 12 in the parallel rows to allow larger branches to be cut with the tip of the chain saw 100.

The teeth 12 are provided with angled edges in order to help retain the chain 104 on its path through the channel 103 around the periphery of the chain guide 102. As shown in FIGS. 1–6, the angled surface 18 is provided on the upstream edge of each tooth 12, 22, relative to the motion of the chain 104 about the chain guide 102. The arrow in FIG. 4 indicates the direction of motion. The surface 18 is angled laterally outwardly in an upstream direction so that it tends to guide the chain 104 back into its path should a portion of the chain 104 move out of the peripheral channel 103 on the chain guide 102. The surface is preferably at an angle of about 45° to the direction of motion. Referring to FIGS. 1–6, in the embodiment of the attachment 2 illustrated therein, the angled surface 18 is formed by providing a substantially flat tooth 12, 22 with an upstream edge that is bent laterally outwardly to provide the surface 18. This tooth configuration has the advantages of accomplishing the desired angled surface guide while maintaining simplicity of construction and easy manufacture.

Another feature of the invention is the provision of spacers to inhibit bending of the teeth toward the chain 104. Still referring to FIGS. 1–6, in the illustrated embodiment, the teeth 12, 22 are arranged in opposite confronting pairs when the members 4 are mounted on the opposite faces of the chain guide 102. Each pair of teeth 12, 22 includes one tooth 12, 22 of each member 4, with the two teeth 12, 22 being substantially parallel to each other. The spacer 16 extends perpendicularly between tip portions of the teeth 12, 22 in each pair.

As shown in FIGS. 1–6, the spacer 16 may be formed by bending the tips of the confronting teeth 12, 22 laterally inwardly toward each other. The confronting edges of the bent tips 16 preferably abut each other to provide resistance to inward bending of the teeth 12, 22. The desired abutting relationship may be maintained by welding the bent tips 16 together. Alternatively, the two bent tips may overlap each other with one tip either abutting the inner face of the opposite tooth or being secured to the other tip, by welding, a fastener, or other suitable means.

Together, the bent tips 16 form a blunt outer end of the pair of teeth 12, 22. In the illustrated configuration, each half of the blunt outer end 16 is integral with its corresponding tooth 12, 22 and elongated member 4. The blunt outer end is preferably integral with at least one of the teeth 12, 22 in the pair. This may be accomplished by the two bent tip arrangement shown in FIGS. 1–6, by forming the entire blunt outer end on one of the teeth, or by forming the two teeth in the pair and the blunt outer end as a single integral stamped metal or molded plastic piece. Whatever the technique for forming the blunt outer end, each tooth 12, 22 preferably has opposite edge portions 14 that taper inwardly toward each other to the blunt outer end. This tapering of the outer ends of the teeth 12, 22 helps to guide vegetation to be cut into the spaces between the teeth 12, 22 and into contact with the moving chain 104.

Figure 3:
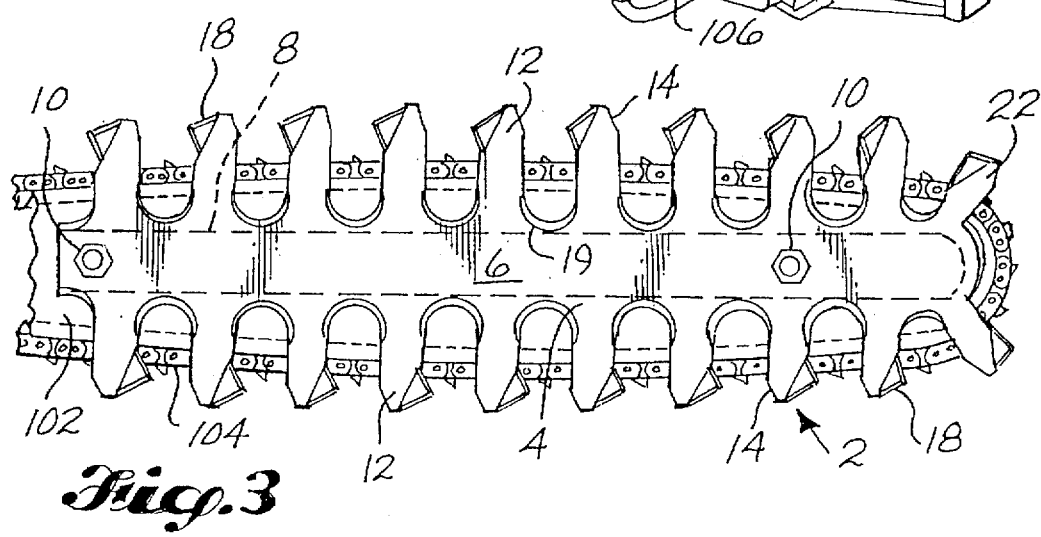
FIG. 3 is an elevational view of one of the faces of the chain guide shown in FIGS. 1 and 2 and the attachment member mounted thereon.

The outer edges of the elongated members 4 between the outer portions of the teeth 12, 22 are provided with a bevel 19 (FIG. 3). The bevel 19 helps to guide cut vegetation away from the chain 104. The bevel may be formed by a straight angle or by a rounded edge.

FIG. 7 illustrates a modification of the embodiment shown in FIGS. 1–6. Elements of the attachment shown in FIG. 7 corresponding to elements in FIGS. 1–6 have the same reference numeral with the addition of the letter "A". In FIG. 7, the forward teeth 22 shown in FIGS. 1–4 and 6 are omitted to expose a greater end portion of the chain 104 and chain guide 102 to enable the cutting of relatively large branches. The elongated member 4A has a center portion 6A with essentially the same structure as that shown in FIGS. 1–6, including the spacing and strengthening rib 8. As shown in FIG. 7, the teeth 12A of the member 4A lack the bent upstream edge 18 shown in FIGS. 1–6. However, they preferably are provided with upstream angled surfaces to help retain the chain 104 on its path. In other respects, the modified embodiment shown in FIG. 7 is substantially the same as that shown in FIGS. 1–6.

FIG. 8 illustrates another modification of the embodiment shown in FIGS. 1–6. Corresponding elements have the same reference numerals as in FIGS. 1–6, with the addition of the letter "B". The modification shown in FIG. 8 is found in the structure of the teeth 12B. Instead of the bent tip 16 shown in FIGS. 1–7, each tooth 12B has a spacer pin 16B, described further below in reference to FIGS. 9–11. The angled surface is also formed differently from that shown in FIGS. 1–6. Referring to FIG. 8, the upstream edge of each tooth 12B is beveled, as at 18B, to provide the angled surface.

Another embodiment of the attachment is shown in FIGS. 9–11. The elements of this embodiment that correspond to the elements of the embodiment shown in FIGS. 1–6 have the same reference numerals as in FIGS. 1–6, with the addition of the letter "C". Referring to FIGS. 9–11, a pin 16C extends perpendicularly between tip portions of the teeth 12C and is attached to the these tip portions. The pin 16C forms a spacer for inhibiting bending of the teeth 12C toward the chain 104, as described above. The pin may be cylindrical, as shown, or may have any of a variety of other configurations. In this embodiment, there is no blunt outer end on the pair of teeth, and the space between the two teeth 12C is open except for the presence of the pin 16C. As shown, there also is no angled surface, such as the surfaces 18 and 18B shown in FIGS. 1–6 and 8. However, such a surface is preferably provided in combination with the spacer pin 16C.

FIG. 12 shows a modification of the embodiment shown in FIGS. 9–11. In this embodiment, the two forward teeth are replaced by an arcuate forward tip guard 26 that encloses the front end of the chain guide 102. Such a forward tip guard could also be provided on the embodiment shown in FIGS. 1–6. The tip guard 26 has the advantages of increasing the protection of the user and surrounding objects against unintended contact with the chain 104. The corresponding disadvantage is that, when this modified attachment is mounted on the chain saw 100, the chain saw 100 cannot be used to cut any branch that will not fit between adjacent teeth 12C in the opposite rows of teeth 12C. Thus, the optional tip guard 26 would normally be included only in attachments intended to be used for relatively light duty trimming operations.

FIGS. 13–15 show the currently preferred embodiment of the invention. The elements of this embodiment that correspond to the elements of the embodiment shown in FIGS. 1–6 have the same reference numerals as in FIGS. 1–6, with the addition of the letter "D". Referring to FIGS. 13–15, in the preferred embodiment, the lateral spacing of the teeth 12D is accomplished by an angled portion 30 of the elongated member 4D in place of the rib 8 shown in FIGS. 1–6. This angled construction is preferred because it is more economical to manufacture. The entire elongated member 4D may be manufactured by die cutting it from a piece of sheet metal.

Still referring to FIGS. 13–15, the attachment of the preferred embodiment comprises first and second elongated members 4D, which are preferably mirror images of each other. The two members 4D are mountable on the opposite faces of the chain guide 102, as shown in FIGS. 13 and 15. Each member 4D includes an elongated center portion 6D configured to be secured to the chain guide 102 in a position closely adjacent to the corresponding face of the guide 102. The securing of the center portion 60 is preferably accomplished by a plurality of bolts 10D, as described above in connection with the embodiment of FIGS. 1–6. An elongated angled portion 30 extends laterally outwardly from the outer edge of the center portion 6D and forms an acute angle X with the chain guide 102. The angle X is preferably about 45°. However, as used herein, the term "acute angle" is intended to include angles of less than 45° and ranging therefrom to angles as large as 90°. A plurality of spaced apart teeth 12D project from the outer edge of the angled portion 30 substantially parallel to the chain guide 102 over and beyond the chain 104.

Each tooth 12D has a main flat, substantially rectangular portion 32 with substantially parallel opposite edges. The main portion 32 is integrally joined to the angled portion 30 at a radiused junction 34. The tooth 12D also has a pointed outer tip portion 36 with edges that taper inwardly toward each other from the main portion 32 to a pointed end. An angled surface 18D is formed on the upstream edge of the main portion 32 of the tooth 12D, relative to the motion of the chain 104 about the chain guide 102. The direction of motion of the chain 104 is indicated by the arrow in FIG. 14. Like the angled surface 18 of the embodiment of FIGS. 1–6, the angled surface 18D shown in FIGS. 13–15 angles laterally outwardly in an upstream direction to help retain the chain 104 on its path around the periphery of the chain guide 102. The angled surface 18D preferably extends along the upstream edge from the pointed tip portion 36 to and along the radiused junction 34. The angled surface 18D is preferably formed by bending the upstream edge of a substantially flat tooth laterally outwardly. However, the angled surface could also be formed by a bevel, as in FIG. 8.

The angled portion 30 of the elongated member 4D and the teeth 12D may extend all the way around the working portion of the chain 104 or only a portion thereof. For example, the teeth 12D, or the teeth 12D and the angled portion 30, could be omitted from one of the longitudinal edges of the chain guide 102 and/or the rounded tip of the chain guide 102, as in FIG. 7. Alternatively, in place of teeth on the tip of the chain guard 102, a tip guard like the one in FIG. 12 could be provided. Preferably, on each elongated member 4D, the teeth 12D are arranged in two rows extending in opposite directions from the angled portion 30. The teeth 12D may be arranged in opposite confronting pairs, with the teeth 12D in each pair being substantially parallel to each other. The attachment may further comprise a spacer extending perpendicularly between the teeth 12D in each pair to inhibit bending of the teeth toward the chain 104. The spacer may take the form of a pin, as shown in FIGS. 9–11, the form of the blunt bent tips, as shown in FIGS. 1–6 and 7, or some other form.

Another feature that may be provided in the embodiment shown in FIGS. 13–15 is a means for adjusting the gap between the teeth 18D. To accomplish this, one of the elongated members 4D would be provided with two holes for each bolt fastener 10D or, alternatively, with a slot for each bolt fastener 10D instead of a round hole. Such an arrangement allows the modified elongated member 4D to be moved longitudinally relative to the other elongated member 4D to offset it with respect to the other member 4D. The offset decreases the effective distance between adjacent teeth 12D. Attachments with this modification would not include the spacer feature.

The installation of the attachment of the invention on a chain saw can be accomplished quickly and easily. The only modification of the chain saw that may be required is the drilling of one or two holes through the chain guide. For embodiments of the attachment having elongated members that are separate from each other, installation simply requires positioning the two members adjacent to the chain guide faces and inserting and securing the bolts. For embodiments in which the members are joined to each other, installation is the same except that the two members are slid onto the chain guide like a sleeve, rather than being separately positioned from the sides. In either case, the attachment may be removed and reinstalled, as desired.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. An attachment for a chain saw of a type having an elongated chain guide with opposite faces bounded by a periphery, and an endless chain powered by a motor to move around said periphery, said attachment comprising first and second elongated members mountable on said opposite faces; each said member including an elongated center portion configured to be secured to the chain guide in a position closely adjacent to the corresponding face thereof, an elongated angled portion extending laterally outwardly from an edge of said center portion and forming an acute angle with the chain guide, and a plurality of spaced apart teeth positioned to project from said angled portion substantially parallel to the chain guide over and beyond the chain; each said tooth including, on an upstream edge of said tooth, relative to the motion of the chain about the chain guide, an angled surface angled laterally outwardly in an upstream direction to help retain the chain on a path around said periphery.

2. The attachment of claim 1, wherein each said tooth has a main portion that has substantially parallel opposite edges and that extends from a radiused junction with said angled portion to a pointed outer tip portion, and said angled surface extends along an upstream one of said opposite edges and an upstream portion of said radiused junction.

3. The attachment of claim 2, wherein each said tooth is substantially flat, and said upstream edge is bent laterally outwardly to provide said surface.

4. The attachment of claim 3, wherein, on each said member, said teeth are arranged in two rows extending in opposite directions from said angled portion.

5. The attachment of claim 2, in which, when said members are mounted on said faces, said teeth are arranged in opposite confronting pairs, with the teeth in each said pair being substantially parallel to each other; and said attachment further comprises a spacer extending perpendicularly between the teeth in each pair to inhibit bending of the teeth toward the chain.

6. The attachment of claim 5, wherein said spacer comprises a pin extending between and attached to said teeth in the corresponding pair.

7. The attachment of claim 2, wherein, on each said member, said teeth are arranged in two rows extending in opposite directions from said angled portion.

8. The attachment of claim 1, wherein said upstream edge is beveled to provide said surface.

9. The attachment of claim 1, wherein each said tooth is substantially flat, and said upstream edge is bent laterally outwardly to provide said surface.

10. The attachment of claim 9, wherein, on each said member, said teeth are arranged in two rows extending in opposite directions from said angled portion.

11. The attachment of claim 1, in which, when said members are mounted on said faces, said teeth are arranged in opposite confronting pairs, with the teeth in each said pair being substantially parallel to each other; and said attachment further comprises a spacer extending perpendicularly between the teeth in each pair to inhibit bending of the teeth toward the chain.

12. The attachment of claim 11, wherein said spacer comprises a pin extending between and attached to said teeth in the corresponding pair.

13. The attachment of claim 1, wherein, on each said member, said teeth are arranged in two rows extending in opposite directions from said angled portion.

* * * * *